United States Patent [19]

Larson et al.

[11] 4,374,737
[45] Feb. 22, 1983

[54] NONPOLLUTING DRILLING FLUID COMPOSITION

[75] Inventors: Dana E. Larson; Ronnie J. Mouton, both of P.O. Box 53094, Lafayette, La. 70505; Chris J. Mocek, Houston, Tex.

[73] Assignees: Dana E. Larson; Ronnie J. Mouton, both of Lafayette, La.

[21] Appl. No.: 285,431

[22] Filed: Jul. 24, 1981

Related U.S. Application Data

[63] Continuation of Ser. No. 111,543, Jan. 14, 1980, abandoned.

[51] Int. Cl.³ .............................................. C09K 7/06
[52] U.S. Cl. .............................. 252/8.5 P; 252/8.55 R
[58] Field of Search ............ 252/8.5 C, 8.5 P, 8.55 B, 252/8.55 R

[56] References Cited

U.S. PATENT DOCUMENTS

| | | | |
|---|---|---|---|
| 2,698,833 | 1/1955 | Wilson | 252/8.5 |
| 2,999,063 | 9/1961 | Hoeppel | 252/8.5 |
| 3,214,374 | 10/1965 | Sample | 252/8.5 |
| 3,217,802 | 11/1965 | Reddie et al. | 252/8.55 |
| 3,223,622 | 12/1965 | Lummus et al. | 252/8.5 |
| 3,761,410 | 9/1973 | Mondshine et al. | 252/8.5 |
| 3,850,248 | 11/1974 | Carney | 166/291 |

Primary Examiner—Herbert B. Guynn
Attorney, Agent, or Firm—Guy E. Matthews

[57] ABSTRACT

Disclosed is a nonpolluting drilling fluid composition. The composition mixture consisting essentially of a concentrate and any nonpolluting oil. The concentrate consists essentially of diethanolamide, a fatty acid, and a imidazoline/amide mixture.

7 Claims, No Drawings

NONPOLLUTING DRILLING FLUID COMPOSITION

This is a continuation of co-pending U.S. patent application Ser. No. 111,543, filed Jan. 14, 1980, now abandoned.

The present invention relates to a new and improved drilling fluid composition. Such composition finds use as a drilling mud, and more particularly as a drilling mud having nonpolluting, non-diesel fuel based properties.

Until recently, diesel fuel based driling muds and the like provided the only reliable method for providing lubricants for drilling for hydrocarbons. The major drawback was that in offshore use, a logistics problem was encountered in handling this potentially pollution causing material. Such diesel fuel based fluids cannot be dumped into the ocean or because of environmental and pollution concerns. Thus, such diesel fuel are required to be transported to some type of disposal system on shore.

U.S. Pat. Nos. 2,222,949; 2,316,967; 2,316,968; and 2,698,833, relate generally to oil base, non-aqueous drilling fluids. The fluids disclosed in those patents are prepared with constituents that are inherently polluting. The fluid of U.S. Pat. No. 2,698,833, is prepared with a thermally stable oil having less than about five percent aromatics and unsaturates by volume, thereby to be nonfluorencing.

U.S. Pat. No. 3,761,410, discloses a lubricating composition for increasing the lubricity of water base drilling fluid when dispersed as discrete small non-emulsified droplets in the fluid. The lubricating composition includes a water insoluable alkyl alcohol, a lubricating additive selected from the group consisting of vegetable oils, sulfurized vegetable oils, sulfated vegetable oils, sulfurized tall oil, and mixtures thereof, and a pour point depressant selected from the group consisting of methanol, ethanol, n-propanol, isopropanol ethylene glycol, propylene glycol, and mixtures thereof.

Previously, the Applicants developed a non-polluting additive for improving the rheological properties of aqueous drilling mud. In its broadest form, the Applicants' prior additive consisted essentially of the following ingredients in the volume percent proportion ranges indicated:

| | | |
|---|---|---|
| lubricity agent | .04 | 8% |
| emulsifying agent | .02 | 2% |
| fluid loss control agent | .0 | .01% |
| nonpolluting, biodegradable oil selected from the group consisting of mineral and vegetable oils | 53 | 71% |
| water | balance | balance |

The present invention has as one of its objects to provide a mixture for adding with nonpolluting, nonfluorescing oil and fresh water or sea water to form a drilling mud for enabling drilling of oil and gas wells and the like.

The concentrate of the present invention consists essentially of:

(a) 12.5% to 42.5% by weight of diethanolamide of the formula

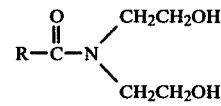

which in the preferred embodiment is a product sold under the trademark "Witcamide 511";

(b) 40.0% to 70.0% by weight of a tall oil fatty acid, the main component of which is

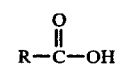

which in the preferred embodiment is a product sold under the trademark "Acintol FA-1";

(c) and 2.5% to 32.5% by weight of an imidazoline/amide mixture which consists essentially

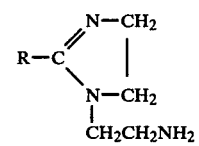

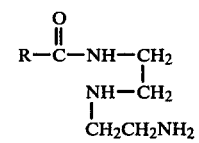

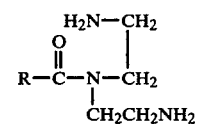

which in the preferred embodiment is a product sold under the trademark "Witcamine 209";

wherein R is primarily unsaturated straight chain hydrocarbon groups having 17 carbon atoms, and is the hydrocarbon residue of tall oil fatty acid, i.e. the n-alkenyl hydrocarbon residue remaining after the removal of the carboxyl group from tall oil fatty acid, which is primarily a mixture of oleic acid, linoleic acid and linolenic acid.

At ambient temperature, the likely chemical interaction would be the formation of tall oil fatty acid salts of the various amine-containing components, i.e.:

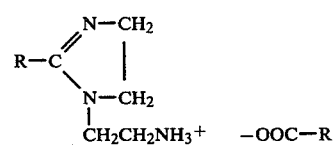

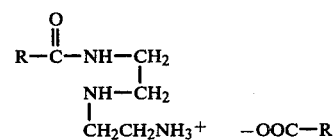

-continued

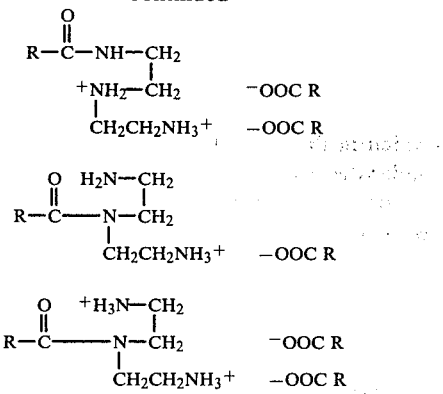

The tall oil fatty acid salts of diethylene triamine and diethanolamine are normally minor constituents, and the amount of salts formed is primarily dependent upon the amount of the fatty acid with respect to the imidazolene/amide mixture.

The concentrate is normally added to a nonpolluting, nonfluorescing, biodegradable oil to form a composition, which in the preferred embodiment is about 3% by volume of the concentrate and 97% by volume of the oil.

The oil may be selected from any known pure, biodegradable, nonfluorescing, vegetable or mineral oil such as white mineral oil, peanut oil, soybean oil, cottonseed oil, corn oil, rice oil, and safflower oil. It will also be appreciated that there are numerous other oils which possess the requisite biodegradable character and which could be used in place of or in addition to any of the aforementioned oils. The mineral oils employed are preferably pure, refined, tasteless, colorless, and odorless.

The use of nonpolluting oils in the present invention has the advantages of being nonfluorescent and thus will not interfere with geological analysis of formation cores and cuttings as do crude and diesel oils. Such nonpolluting oils further do not require additional emulsifiers to maintain the emulsion as do crude and diesel oils. Additionally, such nonpolluting oils improve mud rheological properties such as funnel viscosity, plastic viscosity, and yield point, over those obtained with crude or diesel oil.

A typical formulation of the present invention is prepared by mixing together 2.5 lb. of "Witcamide 511", 5 lb. of "Acintol FA-1", and 1 lb. of "Witcamine 209" with 42 gallons of an oil of the type of those set forth above, as for example mineral oil for shipping to the drilling site. In the following examples, the term "composition of the present invention" shall, unless otherwise specified, refer to the typical formulation set forth above. If it is necessary to improve the emulsion or colloidal suspension properties of the fluid, calcium oxide and/or "Bentone" may be added to the composition. For example, 2 llb. of "Bentone" might be added. Thereafter, water can be added in the field to convert to an invert emulsion system and the product could be used as a drilling mud with a minimum amount of pollution problems.

This invention is further illustrated by means of the following examples which set forth the properties of a concentrate additive for a nonpolluting, biodegradable, nonfluorescing oil according to this invention.

EXAMPLE I

The purpose of this experiment was to compare the quality variation, if any, in three samples of the composition of the present invention.

Equipment used: E. P. lubricity tester, stopwatch, variable transformer, Fann emulsion stability tester, mixers, Fann 35-A viscometer, spring balance, triple beam balance, pH meter.

Materials used: three samples of the composition of the present invention, one obtained from Berwick, one sent to the laboratory from Global Chemical Company and the other prepared in the laboratory.

The base oils were brought to the laboratory and their properties including pH, rheology and weight were measured and recorded.

Five emulsions (three unweighted and two weighted samples) were then prepared according to the present invention and tested.

The properties of the emulsions that were measured were rheology, density, electrical stability and lubricity.

| I. Data for Base Oils |   |
| --- | --- |
| A. Berwick Sample |   |
| 1. Weight = 6.95#/gallon |   |
| 2. pH fluctuated between 6.9 and 7.1 |   |
| 3. Rheology |   |
| RPM | °Fann |
| 600 | 10.0 |
| 300 | 5.5 |
| 200 | 4.0 |
| 100 | 2.0 |
| 6 | 6.0 |
| 3 | 5.0 |
| B. Sample of Global Chemicals, Inc. |   |
| 1. Weight 7.00#/gallon |   |
| 2. pH fluctuated between 7.0 and 11.3 |   |
| 3. Rheology |   |
| RPM | °Fann |
| 600 | 11.0 |
| 300 | 5.5 |
| 200 | 4.0 |
| 100 | 2.0 |
| 6 | — |
| 3 | — |
| C. Laboratory Sample |   |
| 1. Weight 7.00#/gallon |   |
| 2. pH fluctuated between 8.6 and 11.7 |   |
| 3. Rheology |   |
| RPM | °Fann |
| 600 | 10.0 |
| 300 | 5.5 |
| 200 | 4.0 |
| 100 | 2.0 |
| 6 | — |
| 3 | — |

| II. Data for Unweighted Emulsions |   |   |   |
| --- | --- | --- | --- |
| A. Berwick Sample (Sample A) |   |   |   |
| 1. Rheology (room temperature) |   |   |   |
| RPM | °Fann |   |   |
| 600 | 154.0 |   |   |
| 300 | 96.0 |   |   |
| 200 | 73.0 | PV = 58cps |   |
| 100 | 46.0 | YP = 38lb/100ft$^2$ |   |
| 6 | 11.0 | Gels 9.0/9.5 |   |
| 3 | 8.5 |   |   |
| 2. Weight = 7.70#/gallon |   |   |   |
| 3. Electrical Stability = 170 volts |   |   |   |
| 4. Lubricity Information |   |   |   |
| Load in Lbs. | Amps | RPM |   |
| 0 | 2.0 | 60 |   |
| 25 | 2.2 | 60 |   |
| 50 | 2.3 | 60 |   |
| 75 | 2.3 | 60 |   |

-continued

| RPM | °Fann | |
|---|---|---|
| 100 | 2.4 | 60 |
| 125 | 2.5+ | 60 |
| 150 | 3.7 | 60 |
| 175 | 2.8 | 60 |
| 200 | 3.0 | 60 |
| 250 | 3.4 | 60 |
| 300 | 3.8 | 60 |

B. Sample of Global Chemicals, Inc. (Sample B)

1. Rheology (room temperature)

| RPM | °Fann | | |
|---|---|---|---|
| 600 | 188.0 | | |
| 300 | 121.5 | | |
| 200 | 93.0 | PV = 66.5cps | |
| 100 | 60.0 | YP = 55.0lb/100ft$^2$ | |
| 6 | 13.5 | Gels 14.5/14.5 | |
| 3 | 10.0 | | |

2. Weight = 7.70#/gallon
3. Electrical Stability = 169 volts
4. Lubricity Information

| Load in Lbs. | Amps | RPM |
|---|---|---|
| 0 | 1.80 | 60 |
| 25 | 1.90 | 60 |
| 50 | 2.00 | 60 |
| 75 | 2.10 | 60 |
| 100 | 2.20 | 60 |
| 150 | 2.40 | 60 |
| 200 | 2.80 | 60 |
| 250 | 3.20 | 60 |
| 300 | 3.50 | 60 |

C. Laboratory Sample (Sample C)

1. Rheology (room temperature)

| RPM | °Fann | | |
|---|---|---|---|
| 600 | 150.0 | | |
| 300 | 90.0 | | |
| 200 | 67.0 | PV = 60cps | |
| 100 | 41.0 | YP = 30lb/100ft$^2$ | |
| 6 | 10.0 | Gels 2.5/8.0 | |
| 3 | 8.0 | | |

2. Weight = 7.70#/gallon
3. Electrical Stability = 173 volts
4. Lubricity Information

| Load in Lbs. | Amps | RPM |
|---|---|---|
| 0 | 2.10 | 60 |
| 25 | 2.20 | 60 |
| 50 | 2.30 | 60 |
| 75 | 2.40 | 60 |
| 100 | 2.60 | 60 |
| 125 | 2.70 | 60 |
| 150 | 2.90 | 60 |
| 175 | 3.00 | 60 |
| 200 | 3.20 | 60 |
| 250 | 3.60 | 60 |
| 300 | 4.00 | 60 |

III. Data for Weighted Emulsions

A. Berwick Sample

1. Rheology

| RPM | °Fann | | |
|---|---|---|---|
| 600 | 163.0 | | |
| 300 | 94.0 | | |
| 200 | 70.0 | PV = 69cps | |
| 100 | 44.0 | YP = 25lb/100ft$^2$ | |
| 6 | 11.0 | Gels 10/12 | |
| 3 | 9.0 | Weight = 12.2 | |

B. Sample of Global Chemicals, Inc. (Sample B)

1. Rheology (room temperature)

| RPM | °Fann | | |
|---|---|---|---|
| 600 | 155.0 | | |
| 300 | 91.0 | | |
| 200 | 67.0 | PV = 64cps | |
| 100 | 42.0 | YP = 27lb/100ft$^2$ | |
| 6 | 11.0 | Gels 9/10 | |
| 3 | 8.5 | Weight = 12.2 | |

Conclusion

All five emulsion samples had properties that were satisfactory. Any variation in data should be considered normal.

EXAMPLE II

Purpose: To prepare two weighted emulsions according to the present invention; one made with Quick Lime, the other made with caustic soda instead of Quick Lime and compare their rheologies.

Materials: The composition of the present invention, 9.7#/gallon NaCL water, sodium hydroxide, Quick Lime, barite.

Equipment: Triple beam balance, Hamilton Beach mixer, spring balance.

Procedure: Prepare two weighted emulsions with the following compositions:

| Sample A: | .462 bbls. of the composition |
| --- | --- |
| | .374 bbls. of 9/7#/gallon NaCl water |
| | 6 g of NaOH |
| | 174 g of Barite |
| Sample B: | .462 bbls. of the composition |
| | .374 bbls. of 9.7#/gallon NaCl water |
| | 6 g of Quick Lime |
| | 174 g of Barite |

The mixing order used is the one printed in the Brine Handbook. All possible variables (such as rate of shear, mixing time, etc.) were either minimized or eliminated. The reason for this was to compare the emulsion properties due to a difference in the composition only.

I. Sample A
(room temperature-no lime, used caustic instead)

| RPM | 600 | 300 | 200 | 100 | 6 | 3 | PV | YP | Gels |
|---|---|---|---|---|---|---|---|---|---|
| °Fann | 135 | 78 | 59.5 | 39.5 | 11 | 9.0 | 57 | 21 | 7.5/9.0 |
| Vis(cps) | 67.5 | 78 | 89.2 | 118.2 | 550 | 900 | cps | lb/100ft$^2$ | — |

II. Sample B
(room temperature-used lime as recommended)

| RPM | 600 | 300 | 200 | 100 | 6 | 3 | PV | YP | Gels |
|---|---|---|---|---|---|---|---|---|---|
| °Fann | 127 | 69 | 51 | 31 | 5.5 | 3.5 | 58 | 11 | 3.0/3.5 |
| Vis(cps) | 63.5 | 69 | 76.5 | 93 | 275 | 350 | cps | lb/100ft$^2$ | — |

III. The weight of each emulsion was 11.9#/gallon. The samples were placed on the shelf for three days to check for separation. After this brief shelf life, the samples were examined. The appearance of each sample was the same. There was no separation of oil or settling of barite in the sample.

IV. To Sample A, 6#/bbl. of Quick Lime was added and mixed for 45 minutes, cooled to room temperature and the rheology -continued

| | | | | | was measured. | | | | |
|---|---|---|---|---|---|---|---|---|---|
| RPM | 600 | 300 | 200 | 100 | 6 | 3 | PV | YP | Gels |
| °Fann | 115 | 69 | 52.5 | 34.5 | 8.5 | 7.5 | 46 | 23 | — |
| Vis(cps) | 57.5 | 69 | 78.7 | 103.5 | 425 | 750 | cps | lb/100ft$^2$ | — |

Conclusion

Weighted emulsion as prepared in this report, seems to be stable whether it is prepared with caustic soda or lime. This is not true with unweighted emulsion.

Apparently, weighted emulsion can be made using either lime or caustic soda.

If caustic soda is used instead of lime, then the addition of lime will not thicken the emulsion but will cause it to thin out slightly.

EXAMPLE III

Purpose: To compare the differences in rheology and electrical stability in experimental samples prepared according to the present invention (which contain varying emulsifier and wetting agent concentrations), and also to observe any differences in the tendency of the emulsions to separate.

Equipment: Hamilton Beach mixer, triple beam balance, Fann 35-A viscometer, Fann emulsion tester, pipettes and other suitable devices for measuring liquids.

Materials: Mineral oil, #1 emulsifier (which is an alkanolamide, also called Witcamide 511, also called C-200); #2 emulsifier (which is an Acintol fatty acid, also called SF-200); a wetting agent which chemically is an imidazoline compound and is referred to as KS-900 or Witcamide 209. Other materials used are:
a. 9.7#/gallon NaCl water
b. Quick Lime
c. Nopcogen 22-0 emulsifier (From Diamond Shamrock)

Procedure: Six different samples were prepared. The same mixer, mixing procedure, rheometer and emulsion tester was used to prepare all samples. In addition, the mixing time for each sample was not varied. The purpose for doing this was to eliminate all variables which might lead to false conclusions.

The only variables purposely introduced were the emulsifier and wetting agent concentrations.

After the samples were prepared and tested, they were placed on the shelf for a period of thirteen days to check for separation.

| Rheology at Room Temperature-°Fann v. RPM | | | | | | | | | |
|---|---|---|---|---|---|---|---|---|---|
| Sample | 600 | 300 | 200 | 100 | 6 | 3 | PV | YP | Gels |
| A | 98 | 56 | 40 | 22.5 | 3.5 | 2.5 | 42 | 44 | 2.5/3.0 |
| B | 156 | 89 | 65 | 40 | 9.0 | 7.0 | 67 | 22 | 7.0/8.0 |
| C | 172.5 | 99 | 74 | 46 | 11 | 8.0 | 73.5 | 22.5 | 8.0/7.5 |
| D | 185 | 107 | 79 | 46 | 8 | 6.0 | 78 | 29 | 6.0/6.0 |
| E | 210 | 124 | 92.5 | 57 | 13 | 10.0 | 86 | 38 | |
| F | 224 | 135 | 99.0 | 58 | 9 | 6.0 | 89 | 46 | 6.5/7.0 |

| Viscosity at Room Temperature-cps | | | | | |
|---|---|---|---|---|---|
| Sample | 600 | 300 | 200 | 100 | 6 | 3 |
| A | 49 | 56 | 60 | 67.5 | 175 | 250 |
| B | 78 | 89 | 97.5 | 120 | 450 | 700 |
| C | 86.2 | 99 | 111 | 138 | 550 | 800 |
| D | 92.5 | 107 | 118.5 | 138 | 400 | 600 |
| E | 105.0 | 124 | 138.5 | 171 | 650 | 1,000 |
| F | 112.0 | 135 | 148.5 | 174 | 450 | 600 |

| Sample | Amount of Base Oil Used | Emulsifier in Base Oil | Emulsifier in Base Oil | Amount of Wetting Agent | Volume of 9.7#/ gal. NaCl Water | ES |
|---|---|---|---|---|---|---|
| A | 154 ml | 1.200% | 2.5% of Nopcogen 22-0 | .52% | 174 ml | 200 |
| B | 154 ml | .830% | 1.65% | .52% | 174 ml | 110 |
| C | 154 ml | 1.245% | 1.65% | .52% | 174 ml | 120 |
| D | 154 ml | 1.660% | 1.65% | .52% | 174 ml | 170 |
| E | 154 ml | .830% | 2.475% | .52% | 174 ml | 140 |
| F | 154 ml | 1.660% | 3.30% | 1.04% | 174 ml | 180 |

Note:
a. 6 grams of lime was also used in each sample.
b. Standard emulsifier concentration (that used at the present time) is:
1 emulsifier = .83%
2 emulsifier = 1.65%
Wetting agent = .52%

Conclusion

After thirteen days of shelf life, only one sample (Sample A which contained Nopcogen 22-0) had a layer of oil on top. No separation at all was noticed in the other samples. Also, it appears that increasing the emulsifier concentration will increase the viscosity.

EXAMPLE IV

Purpose: To adjust the oil/water ratio of a water contaminated composition to its original ratio.

Discussion: When excess water is added to weighted emulsion, it causes the fluid to thicken until it eventually is no longer a fluid. It was thought that adding oil to readjust the oil/water ratio would fix the mud.

Reagents:
14.2#/gallon sample emulsion (O/W=66:34) water pure composition of the present invention Barite Procedure: One barrel equivalent of 14.2 #/gallon emulsion was contaminated in 20 ml aliquots of water until 129 ml were added. The oil/water ratio at this point was 44/56. The mud thickened considerably but was still a fluid. The amount of oil needed to readjust the ratio was calculated and added. As expected, the mud thinned out. Appropriate amounts of quick lime and barite were added to adjust the weight. The rheologies were checked for each sample and compared.

| | original | +water | +oil +water | +lime +barite +oil +water |
|---|---|---|---|---|
| 600rpm | 129° Fann | 248° Fann | 103° Fann | 151° Fann |
| 300rpm | 80° Fann | 154° Fann | 65° Fann | 94° Fann |
| 200rpm | 62° Fann | 119° Fann | 50° Fann | 73° Fann |
| 100rpm | 43° Fann | 78° Fann | 34° Fann | 48° Fann |
| 6rpm | 14° Fann | 21° Fann | 11° Fann | 11° Fann |
| 3rpm | 11° Fann | 17°Fann | 9° Fann | 8° Fann |
| PV | 49 cps | 94 cps | 38 cps | 57 cps |
| YP | 3lb/100lb$^2$ | 60lb/100ft$^2$ | 27lb/100ft$^2$ | 37lb/100ft$^2$ |
| O/W | 66/34 | 44/56 | 65/35 | 65/35 |

Conclusion

Oil addition is possible to thin a water contaminated emulsion. The oil/water ratio is not critical for viscosity up to approximately 45/55 where the apparent viscosity is about 115/125. This applied to all weights. However, the stability is affected and, for high water percentage, the barite may fall out of solution. It is not known if the oil/water ratios in the Brine Handbook are most stable or not.

EXAMPLE V

Purpose: To prepare a weighted emulsion according to the present invention and compare its rheology before and after the addition of extra emulsifiers.

Equipment: Blenders, Fann 35-A viscometer.

Materials: Base oil, lime, caustic soda, emulsifiers and wetting agents obtained from Global Chemical Company.

Procedure: Prepare a weighted emulsion, measure its rheology, then double the emulsifier concentration to see if the rheology increases.

1. Rheology with standard emulsifier concentration:

| 600rpm | 300rpm | 200rpm | 100rpm | 6rpm | 3rpm | PV | YP | Gels |
|---|---|---|---|---|---|---|---|---|
| 207° Fann | 128° Fann | 99° Fann | 66.5° Fann | 19° Fann | 15° Fann | 79cps | 49lb/100$^2$ | 14/1 |

2. Weight = 1.58#/gallon
3. Oil/Water = 70/30
4. Note: After a half hour of agitation, the concentration of emulsifiers was doubled. There was no apparent increase in viscosity. Additional lime was added and still, with continued agitation, there was no viscosity increase. Finally, a small amount of caustic soda was added (about 1#/bbl.) and within a few minutes a viscosity increase was noticeable. The sample was allowed to cool to room temperature and its rheology was measured. Rheology with additional emulsifiers and caustic soda:

| 600rpm | 300rpm | 200rpm | 100rpm | 6rpm | 3rpm | PV | YP | Gels |
|---|---|---|---|---|---|---|---|---|
| 264° Fannn | 156° Fann | 115° Fann | 70° Fann | 14° Fann | 10° Fann | 108cps | 48lb/100$^2$ | 13/15 |

Conclusion

In order to increase the viscosity of a weighted emulsion, extra emulsifiers will not work, but a small caustic soda addition will thicken it considerably.

EXAMPLE VI

Purpose: To check the mud properties and lubricity with and without the composition of the percent invention on a sample of mud 2-R Drilling Rig #2.

Equipment: Mixers, API filter press, HPHT filter press, Fann 35-A viscometer, E. P. lubricity tester, Fann 50 viscometer.

Materials: Mud from 2-R drilling Rig #2 and unweighted composition of the present invention.

Procedure:
I. Run a mud check on the base mud as follows:
  a. Rheology and gels
  b. API W.L. and HPHT W.L.
  c. Fann 50
  d. Retort analysis
  e. Lubricity check II. To the base mud, add 4% by volume unweighted composition of the present invention and repeat the above except for a retort check.

Data:
I. On base mud (without the composition of the present invention)
  a. Rheology

| RPM | °Fann | |
|---|---|---|
| 600 | 139.0 | PV = 62 cps |
| 300 | 77.0 | YP = 15#/100ft.$^2$ |
| 200 | 54.0 | Weight = 18.3#/gallon |
| 100 | 30.0 | Gels 4.0/12.5 |
| 6 | 3.5 | |
| 3 | 2.0 | | b. API W.L. = 0.8 ml
c. Filter cake thickness = 2/32" (good texture)
d. Retort analysis: 53% water, 38% solids, 9% oil
e. HPHT at 300° F. and 500 psi = 6.4 ml
f. Lubricity

| Torque in Lbs. | Amps | RPM |
|---|---|---|
| 0 | 1.9 | 60 |
| 50 | 2.4 | 60 |
| 100 | 2.9 | 60 |
| 150 | 3.8 | 60 |

II. Data on base mud with 4% composition of the present invention
  a. Rheology

| RPM | °Fann | |
|---|---|---|
| 600 | 138.0 | PV = 62 cps |
| 300 | 77.0 | YP = 15#/100ft.$^2$ |
| 200 | 55.0 | Weight = 18.3#/gallon |
| 100 | 31.0 | Gels 4.0/12.5 |
| 6 | 4.5 | |
| 3 | 3.0 | | b. API W.L. = 0.3 ml
c. Filter cake thickness less than 2/32"
d. HPHT at 300° F. and 500 psi = 6.4 ml
e. Lubricity (after rolling overnight at 150° F.)

| Torque in Lbs. | Amps | RPM |
|---|---|---|
| 0 | 1.7 | 60 |
| 50 | 2.5 | 60 |
| 100 | 3.0 | 60 |
| 150 | 3.4 | 60 |

Conclusion

The rheological properties and temperature stability seem to be unaffected by the addition of the composition of the present invention, however, the lubricating properties of the mud, especially at 150 in. lb., were improved by at least 10%.

The invention is further illustrated in its effect on the threespine stickleback, Gasterosteus aculeatus (Keely Standard Fish Kill Test) in accordance with the following examples.

EXAMPLE VII

Drilling mud additive prepared in accordance with the present invention was added to a glass dilution container of seawater with which the organisms were located. The seawater was maintained within a temperature range of 19.5° C. to 19.8° C. without aeration. The results were in accordance with the following chart:

| Bioassay Conditions | Time, hrs | Control No. | Control % | 20,000 A No. | 20,000 A % | 20,000 B No. | 20,000 B % |
|---|---|---|---|---|---|---|---|
| Organisms Surviving | Start | 10 | 100 | 10 | 100 | 10 | 100 |
|  | 24 | 10 | 100 | 10 | 100 | 10 | 100 |
|  | 48 | 10 | 100 | 10 | 100 | 10 | 100 |
|  | 72 | 10 | 100 | 10 | 100 | 10 | 100 |
|  | 96 | 10 | 100 | 10 | 100 | 10 | 100 |
| Dissolved Oxygen, mg/l | Start | 7.5 |  | 7.5 |  | 7.5 |  |
|  | 24 | 7.5 |  | 7.3 |  | 7.2 |  |
|  | 48 | 7.2 |  | 6.9 |  | 7.0 |  |
|  | 72 | 7.1 |  | 6.5 |  | 6.6 |  |
|  | 96 | 6.9 |  | 6.3 |  | 6.4 |  |
| pH | Start | 8.1 |  | 8.1 |  | 8.1 |  |
|  | 24 | 8.1 |  | 8.0 |  | 8.1 |  |
|  | 48 | 8.2 |  | 8.0 |  | 8.0 |  |
|  | 72 | 8.2 |  | 8.0 |  | 8.0 |  |
|  | 96 | 8.2 |  | 8.0 |  | 8.1 |  |
| RESULTS: 96 hr. TLm* > 20,000 ppm | | | | | | | |

All of the organisms survived the 96 hour test, thus indicating the product of this invention to be nonpolluting and nontoxic to living sea organisms in the event drilling mud should inadvertently spill into the sea.

EXAMPLE VIII

A test similar to that of Example VII was conducted utilizing Diesel Oil No. 2 as the seawater additive. The results were in accordance with the following chart:

| Bioassay Conditions | Start hrs | Control No. | Control % | 20,000 A No. | 20,000 A % | 20,000 B No. | 20,000 B % |
|---|---|---|---|---|---|---|---|
| Organisms Surviving | Start | 10 | 100 | 10 | 100 | 10 | 100 |
|  | 24 | 10 | 100 | 0 | 0 | 0 | 0 |
|  | 48 | 10 | 100 | 0 | 0 | 0 | 0 |
|  | 72 | 10 | 100 | 0 | 0 | 0 | 0 |
|  | 96 | 10 | 100 | 0 | 0 | 0 | 0 |
| Dissolved Oxygen, mg/l | Start | 6.8 |  | 6.8 |  | 6.8 |  |
|  | 24 | 6.6 |  | 6.7 |  | 6.5 |  |
|  | 48 | 6.4 |  | — |  | — |  |
|  | 72 | 6.0 |  | — |  | — |  |
|  | 96 | 5.9 |  | — |  | — |  |
| pH | Start | 8.1 |  | 8.1 |  | 8.1 |  |
|  | 24 | 8.1 |  | 8.0 |  | 8.1 |  |
|  | 48 | 8.0 |  | — |  | — |  |
|  | 72 | 8.0 |  | — |  | — |  |
|  | 96 | 8.0 |  | — |  | — |  |
| RESULTS: 96 hr. TLm* > 20,000 ppm | | | | | | | |

After only twenty-four hours of the test, all of the organisms had expired, indicating that No. 2 Diesel Oil is not appropriate as a drilling mud additive.

While the present invention has been described with reference to particular embodiments thereof, it will be understood that numerous modifications can be made with those skilled in the art without actually departing from the scope of the invention. Accordingly, all modifications and equivalents may be resorted which fall within the scope of the invention as claimed.

We claim:

1. A composition for use as a drilling mud when mixed with water which consists essentially of:
   a concentrate consisting essentially of:
   12.5% to 42.5% by weight of diethanolamide, which consists essentially of

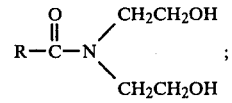

40.0% to 70.0% by weight of a tall oil fatty acid, which consists essentially of

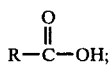

and 2.5% to 32.5% by weight of imidazoline/amide mixture, which consists essentially of

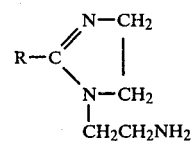

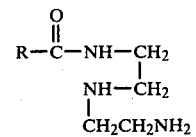

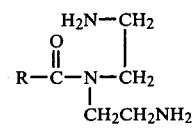

wherein R is primarily unsaturated straight chain hydrocarbon groups having 17 carbon atoms and is the hydrocarbon residue remaining after removal of the carboxyl group from tall oil fatty acids
   and a bidodegradable, non-polluting oil, wherein the concentrate constitutes a minor amount of the composition sufficient to act as an emulsifier when the composition is added to water.

2. The composition as recited in claim 1, wherein: said biodegradable, nonpolluting oil is an oil selected from a group consisting of white mineral oil, peanut oil, soybean oil, cottonseed oil, corn oil, rice oil and safflower oil.

3. The composition as recited in claim 1, wherein: said biodegradable, nonpolluting oil is an oil selected from a group consisting of vegetable oil and mineral oil.

4. The composition as recited in claim 1, wherein: said concentrate constitutes about 3% of said composition.

5. A method of producing an invert emulsion drilling fluid for use in the drilling of wells comprising mixing the following constituents:
   (a) substituted diethanolamide of the formula

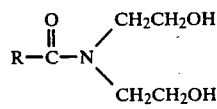

(b) tall oil fatty acid of the formula

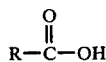

(c) imidazoline/amide components consisting essentially of:

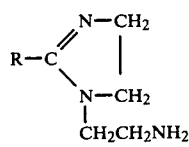

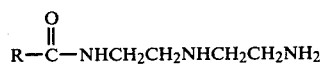

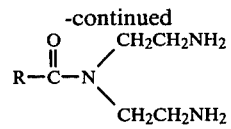

(d) a biodegradable, non-polluting oil; and
(e) water to form an invert emulsion;
wherein the constituents (a), (b) and (c) are present in the following by weight percentages relative to the total of constituents (a), (b) and (c),
(a) 12.5 to 42.5%
(b) 40 to 70%
(c) 2.5 to 32.5%
and wherein the constituents (a), (b) and (c) together are minor proportions of the total constituents (a), (b), (c) and (d) sufficient to act as an emulsifier; and wherein R is primarily unsaturated hydrocarbon groups having 17 carbon atoms and is the hydrocarbon residue remaining after removal of the carboxyl group from tall oil fatty acids.

6. A method of mixing a drilling fluid as set forth as recited in claim 5 wherein said biodegradable, nonpolluting oil is an oil selected from a group consisting of white mineral oil, peanut oil, soy bean oil, cottonseed oil, corn oil, rice oil and sunflower oil.

7. The composition as recited in claim 5 wherein said biodegradable, nonpollutting oil is an oil selected from a group consisting of vegetable oil and mineral oil.

* * * * *